US011123957B2

(12) United States Patent
Patnaik et al.

(10) Patent No.: US 11,123,957 B2
(45) Date of Patent: Sep. 21, 2021

(54) HIGH TEMPERATURE CAPABLE AND THERMAL SHOCK RESISTANT BRAZED ARTICLE

(71) Applicant: Morgan Advanced Ceramics, Inc., New Bedford, MA (US)

(72) Inventors: Abhishek S. Patnaik, Lexington, MA (US); John Antalek, East Freetown, MA (US); Heather Michaud, New Bedford, MA (US)

(73) Assignee: Morgan Advanced Ceramics, Inc., New Bedford, MA (US)

( * ) Notice: Subject to any disclaimer, the term of this patent is extended or adjusted under 35 U.S.C. 154(b) by 0 days.

(21) Appl. No.: 17/116,232

(22) Filed: Dec. 9, 2020

(65) Prior Publication Data

US 2021/0170721 A1 Jun. 10, 2021

Related U.S. Application Data

(60) Provisional application No. 62/946,113, filed on Dec. 10, 2019.

(30) Foreign Application Priority Data

Jan. 28, 2020 (GB) .................................... 2001162

(51) Int. Cl.
| | | |
|---|---|---|
| *C04B 37/02* | (2006.01) | |
| *B32B 9/04* | (2006.01) | |
| *B32B 9/00* | (2006.01) | |
| *C22C 5/02* | (2006.01) | |
| *C22C 19/05* | (2006.01) | |
| *B23K 1/20* | (2006.01) | |
| *C22C 30/00* | (2006.01) | |
| *B23K 35/30* | (2006.01) | |
| *B23K 103/08* | (2006.01) | |
| *B23K 103/00* | (2006.01) | |

(52) U.S. Cl.
CPC ............... *B32B 9/041* (2013.01); *B23K 1/20* (2013.01); *B23K 35/3013* (2013.01); *B32B 9/005* (2013.01); *C22C 5/02* (2013.01); *C22C 19/055* (2013.01); *C22C 30/00* (2013.01); *B23K 2103/08* (2018.08); *B23K 2103/52* (2018.08); *Y10T 428/12611* (2015.01)

(58) Field of Classification Search
None
See application file for complete search history.

(56) References Cited

U.S. PATENT DOCUMENTS 3,663,217 A * 5/1972 Olson ................ B23K 35/3013
420/508
2015/0340742 A1* 11/2015 Kumar ............... B23K 35/3046
428/632

FOREIGN PATENT DOCUMENTS

CN 108422058 A 8/2018

* cited by examiner

*Primary Examiner* — Seth Dumbris
(74) *Attorney, Agent, or Firm* — Servilla Whitney LLC (57) ABSTRACT

A brazed article comprising a ceramic component, a metallizing layer comprising tungsten and yttrium oxide disposed against a surface of the ceramic component, and a bonding layer disposed between the metallizing layer and a metal component wherein said bonding layer comprises a nickel-rich portion proximal to the ceramic component and a gold-rich portion interfacing against the metal component.

22 Claims, 5 Drawing Sheets

HIGH TEMPERATURE CAPABLE AND THERMAL SHOCK RESISTANT BRAZED ARTICLE

CROSS REFERENCE TO RELATED APPLICATIONS

The present disclosure claims priority to U.S. provisional application Ser. No. 62/946,113, filed on Dec. 10, 2019 and United Kingdom application serial no. GB2001162.3 filed Jan. 28, 2020, the entire contents of which are incorporated herein by reference.

FIELD

This disclosure relates to high temperature capable and thermal shock resistant braze assemblies, articles derived from said assemblies and a method of manufacturing said articles.

BACKGROUND

Operating temperatures in jet engines are steadily increasing in a quest for increased efficiencies which provide both an economic and environmental dividend. With an increase in operating temperatures there is an emerging need for engine components to withstand these more extreme operating environments. In particular, joins between ceramic and metal components are required which can reliably operate over a wide temperature window.

The failure mechanism for joints in cyclic temperature environments tends to shift from a stress failure mechanism to a corrosion failure mechanism as the peak temperature increases.

Traditionally, ceramics have been first metallised using a molybdenum-manganese process on ceramic substrate, with the formation of a glassy intergranular phase being a key factor between the ceramic and the metallisation layer. The metallisation layer then enables a braze alloy to join the metal substrate to the metallised ceramic substrate.

However, at higher temperatures, the effectiveness of a glassy intergranular phase bonding the ceramic to the metallisation layer diminishes. In addition, the metallisation layer becomes more prone to oxidation and corrosion.

As such, there is a need for a braze assembly in which a metal component and a ceramic component are bonded together and the braze assembly is capable of being exposed to high temperatures cycles.

SUMMARY

In a first aspect of the present disclosure, there is provided a brazed article (200) comprising:
- a ceramic component comprising alumina (210);
- a metallizing layer (230) comprising tungsten and yttrium oxide interfaced against a surface of the ceramic component; and
- a bonding layer (250) disposed between the metallizing layer (230) and a metal component (220);

wherein said bonding layer (250) comprises a first metallic portion (270) and a gold-rich portion (280), said gold-rich portion interfacing against the metal component (220); and wherein a cross-sectional area of a gold-rich portion (280) is between 10% and 95% of the total cross-sectional area of the bonding layer (250).

In some embodiments, the first metallic portion (270) is proximal to the metallizing layer (230).

The brazed article of the present disclosure has excellent mechanical properties at high temperatures and over multiple temperature cycles of wide temperature ranges, whilst maintaining good hermeticity. These properties are attributable to a combination of strong bonding between the ceramic and metal component; and good ductility to reduce internal stresses due to differences in the coefficient of thermal expansion (CTE) across the braze joint.

The first metallic portion is preferably a nickel-rich portion. Additionally or alternatively, the first metallic portion may comprise iron, vanadium, cobalt, chromium, osmium, tantalum or combinations thereof. The first metallic portion provides mechanical strength to combine with the ductility that the gold-rich portion contributes to the bonding layer. It will be understood that embodiments referring to the nickel-rich portion or nickel-rich particles also cover other metal or metal alloys defined by the first metallic portion.

It is thought that the relative qualities and distribution of the gold-rich portion and the nickel-rich portion impact upon the performance of the brazed article. In general, a higher proportion of the gold-rich portion is considered advantageous when adjacent to the metal component, whilst a higher proportion of the nickel-rich portion is considered advantageous when adjacent to the metallizing layer.

In one embodiment, at least 80% of the cross-sectional surface area of the nickel-rich portion is at least 10 μm or at least 20 μm from a surface of the metal component.

In another embodiment, the gold-rich portion (280) is concentrated at a region of the bonding layer (250) proximal to the metal component (220) in greater amounts relative to a region of the bonding layer (250) distal to the metal component (220).

The gold-rich portion preferably comprises at least 50 wt % or at least 80 wt % or at least 90 wt % gold. The gold-rich portion may comprise other components originating from the original braze alloy used to form the bonding layer or components absorbed from other components within the system (e.g. metal component of metallizing layer). The gold-rich portion may comprise a gold-rich layer. A gold-rich layer is substantially free of other phases, such as the nickel-rich portion.

The gold-rich portion (280) may extend between the metal component (220) and the metallization layer (230). Having the gold-rich portion extending across the bonding layer enables the bonding layer to better absorb stresses at the metallizing layer and the metal component interfaces. The presence of a structural layer like a metallizing barrier layer (140) may be prone to failure due to CTE derived stresses.

The nickel-rich portion (270) may comprise a plurality of nickel-rich particles forming a non-uniformly distributed layer proximal to the ceramic component (210). These nickel-rich particles may be encompassed by the gold-rich portion (280). The gold-rich portion forming a continuous phase encompassing a discontinuous phase comprising nickel-rich particles is thought to produce a bonding layer with both ductility and mechanical strength.

The nickel-rich portion preferably comprises at least 40 wt % or at least 50 wt % or at least 60 wt % or at least 70 wt % at least 80 wt % or at least 90 wt % nickel. The nickel-rich portion may comprise other components originating from the original braze alloy used to form the bonding layer; metallizing barrier layer (if applied) or components absorbed from other components within the system (e.g. metal component of metallizing layer). In one embodiment, the nickel-rich portion comprises at least 10 wt % or at least 15 wt % or at least 20 wt % tungsten. The nickel-rich portion may also comprises at least 5 wt % or at least 10 wt % gold.

The combination of a substantial portion of nickel and tungsten provide a nickel-rich portion which is able to contribute excellent mechanical properties to the bonding layer.

In one embodiment, the nickel-rich portion comprises:
40 to 80 wt % (or 45 to 70 wt %) nickel;
5 to 45 wt % (or 10 to 35 wt %) tungsten; and/or
1 to 20 wt % (or 5 to 20 wt %) gold.

In some embodiments, the bonding layer comprises a gold-rich layer extending between the metal component and the nickel-rich portion (270), said gold-rich layer having a thickness of between 5.0 microns and 35.0 microns. It has been found that too small of a gold-rich layer may result in failure due to reduced ductility at the metal component braze interface, whilst too large of a gold-rich layer may contribute to failure due to reduced mechanical strength in the bonding layer.

The bonding layer (25) may comprise a cross-sectional area of the gold-rich portion (280) that is between 15% and 90% (or between 20% and 85% or between 25% and 80% or between 25% and 75% or between 30% and 70%) of the combined cross-sectional area of the gold-rich portion (280) and the nickel-rich portion (270). These proportions provide a joint with sufficient ductility and mechanical strength to withstand the stresses of high temperature variations whilst maintaining good hermeticity.

The metal component (220) preferably comprises nickel. Nickel in the metal component is thought to migrate into the bonding layer and form part of the nickel-rich portion. The nickel content of the metal component is preferably at least 10 wt % or at least 20 wt % or at least 30 wt % or at least 40 wt % or at least 50 wt %. To prevent excessive migration of the nickel from the metal component into the bonding layer, the nickel content of the metal component may be less than 90 wt % or less than 80 wt % or less than 70 wt %.

The metal component preferably has a CTE of less than $9.0 \times 10^{-6} \cdot °F.^{-1}$ or less than $8.6 \times 10^{-6} \cdot °F.^{-1}$ or less than $8.4 \times 10^{-6} \cdot °F.^{-1}$ or less than $8.2 \times 10^{-6} \cdot °F.^{-1}$ or less than $8.0 \times 10^{-6} \cdot °F.^{-1}$. As the CTE for gold is about $7.9 \times 10^{-6} \cdot °F.^{-1}$ (with the gold-rich portion being similar), a closer CTE match translates to lower stresses at the metal component/bonding layer interface. Preferably, the CTE difference between the gold-rich portion and the metal component is less than $3.0 \times 10^{-6} \cdot °F.^{-1}$ or less than $2.0 \times 10^{-6} \cdot °F.^{-1}$ or less than $1.0 \times 10^{-6} \cdot °F.^{-1}$ or less than $0.5 \times 10^{-6} \cdot °F.^{-1}$.

The metal component (220) may also comprise one or more elements selected from the list consisting of nickel, chromium, tungsten, molybdenum, cobalt, aluminium, titanium, boron, carbon, iron, manganese, silicon, sulphur, copper, niobium, and lanthanum or combinations or alloys thereof.

The interface between the metal component (220) and the gold-rich portion (280) may comprise an interpenetrating region (285). The interpenetrating region provides an interlocking bond between the gold-rich portion and the metal component, with the increased surface contact further strengthening the interface's resilience against stresses stemming from cyclic temperature changes.

The interface between the metallizing layer and the ceramic component is preferably substantially free of a glass phase (i.e. less than 10% or less than 5% of less than 2% or less than 1% of a cross-sectional image of the interface comprises a glass phase.) The glass phase does not perform well under cyclic temperature fluctuations. Correspondingly, the ceramic and/or the metallizing layer is preferably substantially free of glass forming compounds (e.g. less than 5 wt % or less than 3 wt % or less than 1 wt % or less than 0.5 wt % of silica and fluxing agents, such as CaO, which are able to form a glass phase under the brazing conditions applied).

The ceramic component (210) comprises an alumina ceramic comprising alumina of at least 3 wt % or at least 5 wt % or at least 10 wt % or at least 20 wt %. The alumina is thought to be a precursor with yttrium oxide in the formation of an yttrogarnet phase at the interface between the metallizing layer and the ceramic component. The yttrogarnet phase is considered to contribute to the strong adherence between the metallizing layer and ceramic component. The precise amount of alumina required in the ceramic component will be understood to be dependent upon a number of factors including the alumina particle size, the presence of alumina in the metallizing layer; proximity to alumina to the metallizing layer and the brazing conditions applied in the formation of the joint.

In some embodiment, a high purity alumina substrate is used comprising between 99.0 wt % to about 100.0 wt %, or about 99.5 wt % to about 99.9 wt %, or about 99.7 wt % to about 100.0 wt % alumina. A high purity alumina substrate is less likely to contribute towards the formation of a glass phase at the ceramic—metallizing layer interface.

In a second aspect of the present disclosure, there is provided a brazing assembly (100) comprising:
a ceramic component comprising alumina (110);
a metallizing layer (130) comprising tungsten and yttrium oxide interfaced against a surface of the ceramic component; and
a braze alloy (150) disposed between the metallizing layer (130) and a metal component (120);
wherein said braze alloy (150) comprises at least 50 wt % gold.

The brazing assembly represents a precursor to the brazed article prior to the brazing process.

The braze alloy preferably also comprises nickel. The nickel content in the braze alloy may be at least 5 wt % or at least 10 wt %.

The assembly preferably also comprises a metallizing barrier layer (140) disposed between the braze alloy (150) and the metallizing layer (130). The metallizing barrier layer comprises or consists of nickel. Although in some embodiments, the metallizing barrier layer may additionally or alternatively comprise another metal or metal alloy, such as iron, vanadium, cobalt, chromium, osmium, tantalum or combinations thereof. The metallizing barrier layer preferably functions to prevent the inter-dispersal of the metallizing layer and braze alloy during the brazing process.

In a third aspect of the present disclosure, there is provided a method of manufacturing a brazed article according to the first aspect of the present disclosure, comprising the steps of:
(A) providing a ceramic component comprising alumina (110)
(B) providing a source of yttrium oxide
(C) metallizing a surface of the ceramic component (110) with a tungsten component to form a metallizing layer (130)
(D) brazing a metal component (120) to the ceramic component (110) comprising the metallizing layer (130) with a gold-based braze filler material (150) and a source of nickel at sufficient brazing temperature and time to form a bonding layer comprising a braze filler material having a first metallic portion (e.g. nickel-rich portion) proximal to the ceramic component (110) and a gold-rich portion interfacing against the metal component (120).

Step (C) may include metallizing the surface of the ceramic component (110) with the tungsten component and the source of yttrium oxide to form the metallizing layer (130). The metallizing layer (130) formed may comprise tungsten and yttrium oxide interfaced against a surface of the ceramic component.

The method may further comprise a step, after step (B) and prior to step (C), of providing a metallizing barrier layer (140) to the ceramic component (110) comprising the metallizing layer (130).

The source of nickel may be derived from the metal component (120); the gold-based braze filler material (150) and/or the metallizing barrier layer (140).

The yttrium oxide may be sourced from the ceramic component (110) or the tungsten component forming the metallizing layer (130).

For the purposes of the present disclosure, the metallizing layer (130) is inclusive of any interfacial layer at the boundary with the ceramic component which comprises yttrium oxide or compounds derived therefrom.

BRIEF DESCRIPTION OF DRAWINGS

Embodiments will now be described, by way of example only and with reference to the accompanying drawings having like-reference numerals, in which.

DETAILED DESCRIPTION

The embodiments described herein relate to ceramic-to-metal joining. It should be understood that the embodiments of the present disclosure are not limited to joining a ceramic component to a metal component for sealing a feedthrough, and the descriptions and figures are not limited to feedthroughs. The embodiments described herein may have a variety of different applications including, for example, in sensors in turbine engines, where ceramics are used as insulators and are required to be bonded to metals or in high temperature applications requiring strength, vibration resistance, thermal shock resistance, high dielectric strength, hermeticity, wear- and corrosion-resistance.

Figure 1:
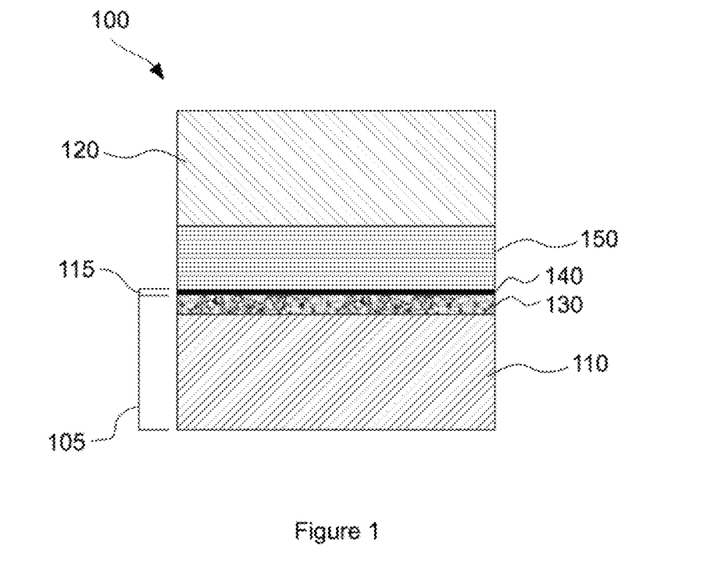
FIG. 1 is a schematic diagram of a layered joint arrangement for joining a ceramic component to a metal component, prior to brazing.

Referring now to FIG. 1 of a brazing assembly 100, a metallized ceramic component 105 includes a metallization layer 130 disposed on a surface of a ceramic component 110. In some embodiments, the metallization layer 130 is disposed on a surface of a ceramic component 110 followed by the disposition of a metallizing barrier layer 140. As will be appreciated by those skilled in the art, a metallized ceramic surface usually enables bonding of a ceramic component to a metal component and can increase the reliability of forming ceramic-to-metal seals.

One of the preferred industrial methods for joining ceramics is brazing, whereby a braze alloy is melted on a ceramic surface at high temperatures, greater than 450° C. The two most critical problems in this process include the poor wetting of chemically inert ceramic surfaces by metallic braze alloys and thermally induced residual stresses generated by a coefficient of thermal expansion (CTE) mismatch at the joint interfaces.

While a successful brazing operation depends on the ability of a braze alloy to wet the surfaces of parts being joined, the differences in the chemical bonding between the free electron state of metals and the stable ionic and/or covalent bonding of ceramics makes the wetting of ceramics difficult.

Generally, it is thermodynamically unfavourable for conventional braze alloys which usually consist of pure metals, such as Sn, Au, Ni, Cu and Ag, to wet or spread over ceramic surfaces effectively, however, this can be improved through metallization of a ceramic surface prior to brazing.

Metallization, generally, refers to the coating of a surface of a component or substrate with a thin layer of metal. The substrate may be non-metallic, such as a ceramic material. The thin layer of metal need not be continuous since a discontinuous layer may still impart metallic character to the surface of the substrate. Metallization of a ceramic surface provides a metallized base layer enabling braze alloys comprising pure metals to wet and spread over ceramic surfaces more effectively.

In some embodiments, the metallization process typically forms a composite layer comprising a metal matrix on a surface of the ceramic. The formation of a metallized ceramic surface includes coating the metal matrix on a portion of the ceramic surface, and subsequently sintering the coated ceramic to an elevated temperature (usually greater than about 1000° C.) under a reducing atmosphere. Metallizing may be performed in a vacuum furnace at pressures ranging from about $1.0 \times 10^{-4}$ to about $1.0 \times 10^{-7}$ mbar or in other chemically inert environments such as those comprising Ar or He gases.

In certain embodiments, the coated ceramic is sintered at a temperature ranging from about 1650° C. to about 1850° C. The metal matrix can be applied using any suitable thin film deposition technique known in the art, including, but not limited to, chemical vapour deposition, physical vapour deposition, screen printing, painting, and sputter coating. The painting technique often includes dipping, spraying, ink printing, syringe or nozzle brushing, or tape transfer.

In one embodiment, the metallization layer 130 may include a refractory metal. Refractory metals can include niobium, molybdenum, tantalum, tungsten and rhenium; refractory metals can also include titanium, vanadium, chromium, zirconium, hafnium, ruthenium, rhodium, osmium and iridium. In one embodiment, the refractory metal includes one or more elements selected from the list consisting of molybdenum, tungsten, niobium, and tantalum.

The metallization layer 130 may further include one or more oxides selected from the list consisting of manganese oxide, yttrium oxide, aluminium oxide, magnesium oxide, calcium oxide, and silicon dioxide.

In a preferred embodiment, the metallization layer 130 comprises tungsten. The amount of tungsten may be higher than about 80 wt %, based on the total weight of the metallization layer 130. In certain embodiments, the amount of tungsten is as high as 100 wt %. In one embodiment, the metallization layer 130 may further comprise yttrium oxide, or yttria. Yttria enables a strong bond between the metallization layer 130 and the ceramic component while promoting the sintering of tungsten in the metallization layer 130.

In one embodiment, the metallization layer 130 comprising tungsten is applied to a surface of a ceramic component 110 containing yttria, for example, an alumina ceramic with yttria additions which may be present in the form of a yttrogarnet phase at the alumina grain boundaries. Yttria from the ceramic body may migrate to the surface of the ceramic and into the metallization layer 130. In another embodiment, the metallization layer 130 comprises a slurry mixture of tungsten and yttria that is directly applied to a surface of a ceramic component 110 in forming the metallization layer 130. The slurry may be reduced or oxidised in a dry/wet hydrogen atmosphere to form a tungsten metal with glass/ceramic composite on which a metallizing barrier layer 140 can subsequently be plated as will be discussed herein. The ceramic component 110 may be substantially free of glass forming compounds to promote yttria in the metallization layer 130 forming a strong bond with the ceramic component 110.

In one embodiment, the ceramic component 110 includes an electrically insulating ceramic. Suitable materials for the ceramic component 110 include aluminium oxide, or alumina ceramics. Alumina is a cost-effective ceramic material with excellent refractoriness, electrical insulation, wear- and corrosion-resistance making it suitable for use in high temperature and high voltage insulation applications. In another embodiment, the ceramic component 110 comprises zirconia toughened alumina (ZTA) ceramics. ZTA ceramics provide excellent mechanical strength, wear-resistance, and toughness and are also well suited to high temperature applications. In further embodiments, the ceramic component 110 may include a source of yttria, such as alumina-yttria ceramics or yttria-stabilized zirconia (YSZ) ceramics.

In one embodiment, the ceramic component 110 is high purity alumina comprising aluminium oxide in the range of about 99.0 wt % to about 100.0 wt %, or about 99.5 wt % to about 99.9 wt %, or about 99.7 wt % to about 99.0 wt % based on the total weight of the alumina ceramic. High purity alumina that is substantially free of glass forming compounds reduces the likelihood of glassy phases or elements thereof from leaching into the metallization layer 130 during the metallization step. In another embodiment, the ceramic component 110 is a high purity alumina but includes small additions of yttria of up to at least 2 wt %, or 3 wt %, or 4 wt % based on the total weight of the ceramic.

In one embodiment, the metal component 120 includes high-strength alloys for use in high temperature applications. Suitable materials for the metal component 120 include nickel or nickel-based alloys. Preferably, the nickel-based alloys comprise relatively low CTE values as compared with other nickel-based alloys, for example, such as Alloys A & D or similar nickel-based compositions. A metal component 120 with a relatively lower CTE reduces the extent of the CTE mismatch with the ceramic component 110 and thereby the thermally induced residual stresses generated upon cooling from the brazing temperature. In one embodiment, the metal component 120 is a nickel-based alloy with alloying additions of one or more elements selected from the list consisting of chromium, tungsten, molybdenum, cobalt, aluminium, titanium, boron, carbon, iron, manganese, silicon, sulphur, copper, niobium, and lanthanum or combinations or alloys thereof.

Before deposition of the metallization layer 130, the surface of the ceramic component 110 may be polished or similarly treated, so as to remove any manufacturing defects and/or to improve the surface flatness. For example, the surface may be polished to about 15 microns ANSI/CAMI. The ceramic component 110 may further be chemically cleaned prior to the metallization step, so as to remove contaminants that may affect bonding. Furthermore, the ceramic component 110 may be thermally annealed and/or calcined at an elevated temperature prior to the metallization step, so as to reduce contamination, reduce residual stresses, and/or heal defects that may have been introduced into the ceramic components during preparation. However, these steps of polishing, cleaning, annealing, and calcining may not be essential for producing high-quality joints; and may be used individually or in combination as per requirement.

In some embodiments, the metallization layer 130 has a thickness in the range of about 5 microns to about 100 microns. In some embodiments, the metallization layer 130 has a thickness in the range of about 10 microns to about 50 microns, and in some specific embodiments, in the range of about 15 microns to about 25 microns.

As mentioned previously, referring to FIG. 1, the metallizing barrier layer 140 is disposed, for example, plated on a surface of the metallization layer 130. In one embodiment, the metallizing barrier layer 140 is a nickel plating applied on a surface of the metallization layer 130. As used herein, the metallizing barrier layer 140 refers to a continuous metallic layer. The metallizing barrier layer 140 further imparts metallic character to a surface of the ceramic component 110 enabling a metal or alloy, such as a braze alloy, to wet and spread over the coated ceramic component 115 effectively.

In some embodiments, the metallizing barrier layer 140 has a thickness in the range of about 1 micron to about 2 microns. In other embodiments, the metallizing barrier layer 140 has a thickness in the range of about 2 microns to about 6 microns. In further embodiments, the thickness of the metallizing barrier layer 140 is up to 5 microns or 10 microns or greater. A metallizing barrier layer 140 having a thickness of 5 microns or 10 microns or greater may be chosen to provide a source of nickel during brazing.

The deposition of the metallizing barrier layer 140, if desired, can be carried out by any appropriate method known in the art including but not limited to electroplating, electroless plating, gas phase deposition, sputtering, or screen printing. In one embodiment, the metallizing barrier layer 140 is deposited by electroplating.

After formation of the metallic barrier layer 140, a coated ceramic component 115 including the ceramic component 110, the metallization layer 130, and the metallizing barrier layer 140, can be bonded to a counterpart metal component 120.

The coated ceramic component 115 is brazed to the metal component 120 by pre-placing a braze filler material 150 between the coated ceramic component 115 and the metal component 120 forming a brazing assembly 100. In some embodiments, the braze filler material 150 may be applied as a braze paste by brushing or painting the braze filler material 150 on the coated ceramic component 115.

The braze filler material 150 may be present in a variety of different forms and geometries depending on requirements including as a disc, wire, wire segment, sheet, shim, ring, washer, powder, paste or foil. In some embodiments, the braze filler material 150 is a braze foil with a thickness ranging from about 50 microns to about 250 microns.

Typically, "brazing" uses a braze filler material 150 having a lower liquidus temperature than the components to be joined. The braze filler material 150 is brought above its melting temperature while protected by a suitable atmosphere such as in a vacuum at pressures ranging from about $1.0 \times 10^{-4}$ to about $1.0 \times 10^{-7}$ mbar or in other chemically inert environments such as those comprising Ar or He gases.

In one embodiment, the brazing assembly 100 is heated at a heating rate ranging from about 1° C./min to about 15° C./min to a "brazing temperature" where it is held for a predetermined time known as the "brazing time". In one embodiment, the brazing temperature is usually at least above the melting temperature of the braze filler material 150. In another embodiment, the brazing temperature may be selected to at least melt a portion of the braze filler material 150. In further embodiments, the brazing temperature is at least between 15° C. to 50° C. above the liquidus temperature of the braze filler material 150. The brazing time may be in the range of about 1 minute to about 20 minutes, or about 2 minutes to about 10 minutes, or about 3 minutes to about 5 minutes depending on requirements. In specific embodiments, the brazing temperature is in the range of about 900° C. to about 1050° C. and the brazing time is in the range of about 2 minutes to about 10 minutes. The brazing assembly may be cooled at a cooling rate ranging from about 1° C./min to about 10° C./min. A slow cooling rate is preferred to reduce the generation of thermally induced residual stresses.

In some embodiments, the brazing assembly 100 may be first heated to a temperature below the brazing temperature for a predetermined time period in the range of between about 2 minutes to about 15 minutes to enable thermal homogenization of all components of the brazing assembly 100.

In a preferred embodiment, the braze filler material 150 comprises a gold-based braze filler material. Gold provides excellent ductility which can accommodate thermally induced residual stresses generated as a result of a CTE mismatch. Gold also exhibits excellent corrosion resistance enabling brazed joints made using the gold-based braze filler material 150 to survive high temperature applications. The braze filler material 150 may further comprise nickel and/or other alloying elements in forming a braze alloy with high temperature capability.

The amount of gold in the braze filler may be higher than about 80 wt %, based on the total weight of the braze filler material 150. In certain embodiments, the amount of gold is as high as 100 wt %. In specific embodiments, the braze filler material 150 comprises about 82 wt % Au and 18 wt % Ni based on the total weight of the braze filler material 150.

Figure 2:
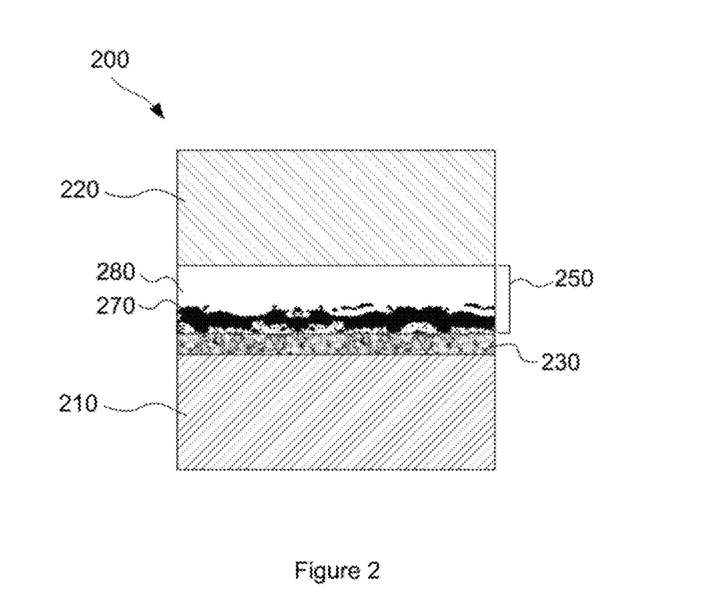
FIG. 2 is a schematic diagram of the ceramic-to-metal joint of FIG. 1, after completion of the brazing process.

Referring now to FIG. 2 of a resultant brazed joint, the brazed article 200 comprises a ceramic component 210 joined to a metal component 220 by a bonding layer 250 disposed between the metallizing layer 230 and a metal component 220. The bonding layer 250 comprises a nickel-rich portion 270 proximal to the ceramic component 210 and a gold-rich portion 280 interfacing against the metal component 220.

In one embodiment, the gold-rich portion 280 is derived from the braze filler material 150. The source of nickel, however, may be derived from the metal component 120 and/or the gold-based filler material 150 and/or the metallizing barrier layer 140 or a combination thereof. For example, in one embodiment, the nickel-rich portion 270 is derived from the metal component 120. In another embodiment, the nickel-rich portion 270 is derived from the braze filler material 150. In a further embodiment, the nickel-rich portion 270 is derived from the metallizing barrier layer 140.

In one embodiment, during the brazing process, the metallization layer 130 and/or the metallizing barrier layer 140 may diffuse into the bonding layer 250. In another embodiment, only the metallizing barrier layer 140 diffuses into the bonding layer 250 and a metallization layer 230 is present in the brazed joint. The metallization layer 230 may comprise one or more elements from the ceramic component 110. The formation of the nickel-rich portion 270 and the gold-rich portion 280 in the bonding layer 250 is postulated to occur due to the miscibility gap in the Au—Ni binary phase system and depends on the relative amounts of Au and Ni in the melt during brazing. In one embodiment, the nickel-rich portion comprises at least 50 wt % Ni, or at least 80 wt % Ni. Similarly, the gold-rich portion comprises at least 50 wt % Au, or at least 80 wt % Au.

In a preferred embodiment, during the brazing process, the nickel-rich portion 270 diffuses to the metallization layer 130. The nickel-rich portion 270 has been found to have a strong chemical affinity to the metallization layer, in one embodiment, where the metallization layer 130 comprises tungsten. The nickel-rich portion 270 may form a nickel-rich layer proximal to the ceramic component 210. The nickel-rich layer may be made up of particles or agglomerates of particles that are non-uniformly distributed proximal to the ceramic component 210. The nickel-rich particles may be surrounded by the gold-rich portion 280.

The nickel-rich layer is thought to protect the metallization layer 130 from oxidation. The nickel-rich portion 270 is present in the bonding layer 250 at a distance of at least 25 microns, or at least 15 microns, from a surface of the metal component 120 in an amount that represents at least 95 wt %, or at least 80 wt %, or at least 50 wt %, of the total wt % of the nickel-rich portion in the bonding layer 250.

In a preferred embodiment, during the brazing process, the gold-rich portion 280 diffuses to the metal component 220. In one embodiment, the gold-rich portion 280 extends between the metal component 220 and the metallization layer 230. In one embodiment, the gold-rich layer interfaces with the metal component and the metallization layer. In some embodiments, the diffusion of the nickel-rich portion 270 towards the metallization layer 230 leads to a nickel-depleted gold-rich portion 280 proximal to the metal component 220. The gold-rich phase may be concentrated at a region of the bonding layer 250 proximal to the metal component 220 in greater amounts compared with a region of the bonding layer 250 distal to the metal component 220. In some embodiments, the gold-rich portion 280 may interpenetrate into the surface of the metal component 220 to form an interpenetrating region 285 (see e.g. FIGS. 3, 4a and 6).

The gold-rich portion 280 may form a gold-rich layer 282 (see e.g. FIGS. 3, 4a, 5 and 6) proximal to the metal component 220. The gold-rich portion 280 is thought to provide a ductile interlayer capable of plastically deforming and accommodating stresses including thermally induced residual stresses.

EXAMPLES

Referring to Table 1, a set of six ceramic-to-metal brazed joints were made using AL-998™ (99.8 wt % $Al_2O_3$) alumina ceramics (available from Morgan Advanced Materials) and a variety of nickel-based alloys and a stainless-steel alloy (Alloy F). The alumina ceramics were metallized using a 15 to 25 μm thick tungsten-yttria (98W-$2Y_2O_3$ wt %) ink sintered between 1650° C. and 1850° C. Each of the metallized ceramics were then electroplated using 1 to 2 μm thick nickel plating. The coated ceramic components 115 were then brazed to the metal components 120: Alloy A, Alloy B, Alloy C, Alloy D, Alloy E and Alloy F using a braze filler material 150 with a nominal composition of 82Au-18Ni wt %. Brazing was performed between 900° C. and 1050° C. for between 2 to 10 minutes.

Scanning electron microscopy (SEM) analysis with energy-dispersive X-ray spectroscopy (EDS) was performed to characterise the microstructure of the brazed joints. The hermeticity of the brazed joints were tested using He leak testing to ensure a hermeticity of at least $1\times10^{-9}$ mbar·L/sec prior to further testing which included exposure to elevated temperatures to test the high temperature capability of the brazed joints. In measuring hermeticity, the protocol of MIL-STD-883 test method 1014 and test condition $A_4$ was employed.

Further testing first included oxidation resistance testing wherein each of the brazed joints were baked in air at 1100° F. for 72 hours, after which hermeticity testing and SEM analysis was repeated. Further testing also included subjecting each of the brazed joints to thermal cycling tests between −65° F. and 1100° F. for up to 600 cycles. Hermeticity tests were repeated after 205, 301, 400, 500 and 600 cycles. The brazed joints were declared to have failed testing if hermeticity requirements were not met.

A second set of brazed joints were made using AL-998™ alumina ceramics and the metal components 120 shown in Table 1, using a braze filler material 150 with nominal composition of 92Au-8Pd wt %. All of the joints in this set were too weak to withstand both oxidation resistance testing and thermal cycling tests. The nickel-rich portion of the bonding layer had an estimated cross-sectional surface area of 6% relative to the total cross-sectional surface area of the bonding layer.

The cross-sectional surface area of the components of the bonding layer were determined using ImageJ™, an image processing software tool. The graphical data was converted to a binary format using a threshold based on the tone of the gold-rich portion or nickel-rich portion, with the composition verified from corresponding EDS spectrum. The proportion of black to white pixels was then used to calculate the cross-sectional area proportions of the nickel-rich portion and gold-rich portion in the bonding layer.

| Ceramic component | Metal Component | Braze Filler Material | Oxidation Resistance Test for 72 hr at 1100° F. Hermeticity (mbar · L/s) | Pass/Fail | Thermal Cycling Test up to 600 cycles between −65° F. and 1100° F. No. of cycles to failure | Pass/Fail |
|---|---|---|---|---|---|---|
| AL-998 | Alloy A | 82Au—18Ni | $5.1 \times 10^{-10}$ | Pass | >600 | Pass |
| AL-998 | Alloy B | 82Au—18Ni | $1.0 \times 10^{-7}$ | Fail | 205 | Fail |
| AL-998 | Alloy C | 82Au—18Ni | $4.1 \times 10^{-10}$ | Pass | 205 | Fail |
| AL-998 | Alloy D | 82Au—18Ni | $7.1 \times 10^{-10}$ | Pass | >600 | Pass |
| AL-998 | Alloy E | 82Au—18Ni | $3.5 \times 10^{-10}$ | Pass | 500 | Fail |
| AL-998 | Alloy F | 82Au—18Ni | $5.1 \times 10^{-10}$ | Pass | 205 | Fail |
| AL-998 | Alloy A, B, C, D, E and F | 92Au—8Pd | — | Fail | — | Fail |

TABLE 1

Alloy compositions are provided below or in the relevant example.

| Alloy C composition (wt %): | Alloy F composition (wt %): |
|---|---|
| Ni: 47 (balance) | Fe: balance |
| Cr: 22 | Cr: 16.0-18.0 |
| Fe: 18 | Ni: 10.0-14.0 |
| Mo: 9 | Mo: 2.00-3.00 |
| Co: 1.5 | N: 0.1 max. |
| W: 0.6 | C: 0.03 max. |
| C: 0.1 | Mn: 2.0 max. |
| Mn: 1 max. | Si: 0.75 max. |
| Si: 1 max. | P: 0.045 max. |
| B: 0.008 max. | S: 0.030 max. |
| Nb: 0.5 max. | |
| Al: 0.5 max. | |
| Ti: 0.15 max. | |

Example 1

Alumina Brazed to Alloy A

Figure 3:
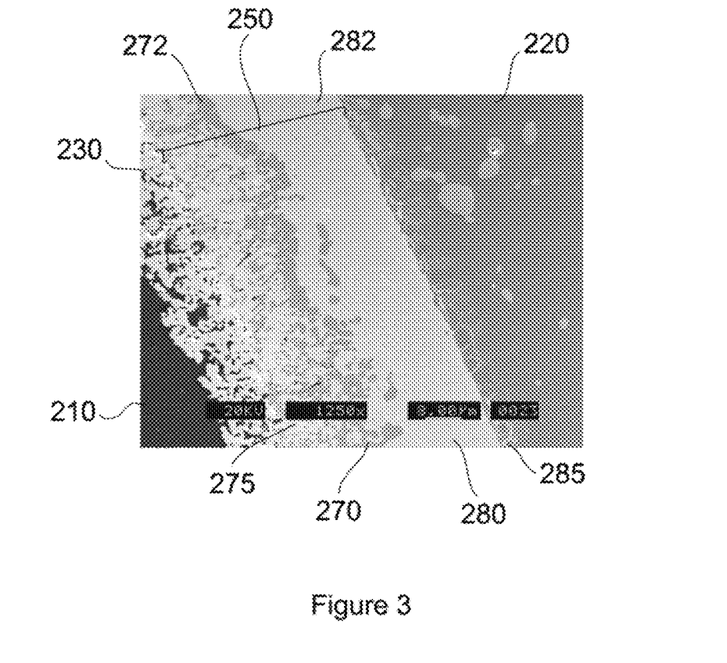
FIG. 3 shows a backscattered electron image of a typical region in a brazed joint made using AL-998 alumina and Alloy A.

Referring now to FIG. 3, a brazed joint was made using a ceramic component 210 made from AL-998 alumina and a metal component 220 made from Alloy A according to the method described herein using the 82Au-18Ni wt % braze filler. The composition of the Alloy A is shown in Table 2.

TABLE 2

| | Ni | Cr | Mo | Co | Al | Ti | C | Fe | Mn | Si | Cu | W | La |
|---|---|---|---|---|---|---|---|---|---|---|---|---|---|
| Min (wt %) | 46.9 | 20.0 | 1.0 | 0.0 | 0.2 | 0.0 | 0.1 | 0.0 | 0.3 | 0.3 | 0.0 | 13.0 | 0.0 |
| Max (wt %) | 65.2 | 24.0 | 3.0 | 5.0 | 0.5 | 0.1 | 0.2 | 3.0 | 1.0 | 0.8 | 0.5 | 15.0 | 0.1 |

The bonding layer 250 includes a nickel-rich portion 270 proximal to the tungsten-yttria metallization layer 230. The concentration of nickel in the bonding layer 250 is derived from a combination of the 18 wt % Ni in the Au—Ni braze filler material, the 1 to 2 µm thick nickel plating observed to have entered into solid solution of the melt, and nickel resulting from the partial dissolution of the surface of Alloy A as indicated by the interpenetrating region 285.

The nickel-rich portion 270 is present in the bonding layer 250 at an average distance of approximately 26.0 microns away from the surface Alloy A in an amount that represents about 95 wt % of the total amount of the nickel-rich portion 270 in the bonding layer 250. The nickel-rich portion 270 in the bonding layer 250 was observed to have migrated towards the metallization layer 230 during brazing. This is likely to be due to the chemical affinity of Ni towards W in the tungsten-yttria metallization layer 230. This affinity was further evidenced in EDS analysis in which X-ray elemental mapping showed traces of W present in some of the nickel-rich particles in the bonding layer 250 adjacent to the metallization layer 230.

The nickel-rich portion 270 is distributed in bulk form as a nickel-rich layer 272 between a region proximal to the ceramic component 210 and towards the centre of the bonding layer 250. The average bonding layer 250 thickness is approximately 42.0 microns thick. The nickel-rich portion 270 is also distributed as isolated or agglomerated particles embedded in the gold-rich matrix in a eutectic-like distribution 275 between the nickel-rich layer 272 and the metallization layer 230. The W in the metallization layer 130 was observed not to have oxidised. It is postulated that the nickel-rich portion 270 provides a buffer layer to trap oxygen and/or to inhibit W from diffusing into the bonding layer 250 or being mobile such that W is not exposed to oxidation.

The bonding layer 250 includes a gold-rich portion 280 interfacing against the metal component 220 and observed to have infiltrated into the intergranular regions of the surface of Alloy A forming the interpenetrating region 285 which may indicate an interlocking bond at the metal component/bonding layer interface. The diffusion of the Au bulk towards the metal component 220 and exposed surfaces may further create an oxygen diffusion barrier, again protecting the metallization layer 230. Similarly, a nickel-rich presence in the immediate vicinity of the metallization layer 230/ceramic component 210 interface indicates good bonding with the coated ceramic 115, while the yttria in the metallization layer 230 enables good bonding with the ceramic component 210. EDS analysis showed the presence of Al in the metallization layer 230, likely to be due to bonding with yttria forming yttrogarnet. The presence of Al in the metallization layer 230 may have further enhanced sintering of W during the metallization step.

While the gold-rich portion 280 extends between the metal component 220 and the metallization layer 230, a gold-rich layer 282 depleted of the Ni-rich phase was observed using SEM, and confirmed using X-ray elemental mapping, between the metal component 220 and the Ni-rich layer 272. This gold-rich layer 282 provides a highly ductile interlayer capable of plastically deforming to absorb stresses including thermally induced residual stresses arising due to CTE mismatch as well as stresses induced during thermal cycling; hence, the brazed joint survived over 600 cycles of thermal cycling between −60° F. and 1100° F.

The formation of the nickel-rich portion 270 and the gold-rich portion 280 is postulated to occur due to the miscibility gap in the Au—Ni binary phase system which leads to a nickel-rich phase with gold in solution, and a gold-rich phase with nickel in solution. Therefore, the nickel-rich portion 270 is expected to include some gold, and the gold-rich portion 270 to include some nickel. However, the diffusion of the Ni-rich portion 270 towards the W-rich metallization layer 130 during brazing leading and the formation of the gold-rich layer 282 interfacing the metal component 220 together provide a highly advantageous system with both strength and ductility.

These mechanisms, including the bonding between the ceramic component 210 and the metallization layer 230 including alumina-yttria bonding, the bonding between the metallization layer 230 and the bonding layer 250 including the metallic character provided by the metallization layer 230 in facilitating brazing, and the bonding between the bonding layer 250 and the metal component 220 including the interpenetrating region 285 each provide a strongly bonded brazed joint. In addition, the distributions of the nickel-rich portion 270 and the gold-rich portion 280 may explain the excellent He hermeticity of $5.1 \times 10^{-10}$ mbar·L/s achieved following oxidation resistance testing in air at 1100° F. for 72 hours.

The ordered arrangement of the eutectic-like distribution 275 and the nickel-rich layer 272 is promoted by the diffusion of the Ni-rich portion 270 towards W in the tungsten-yttria metallization layer 230 reinforcing the strength of the ceramic-braze interface while providing a buffer layer to protect the metallization layer 230. The gold-rich portion 280 extending between the metal component 220 and the metallization layer 230 provides a ductile matrix in the bonding layer 250. The formation of the gold-rich layer 282 interfacing the metal component 220 provides a ductile interlayer to accommodate stresses generated during thermal cycling. Therefore, the layered bonding arrangement not only reinforces the strength of the joint but also enables load transfer to the highly ductile gold-rich layer 282 capable of plastic deformation. This arrangement may also provide a gradation in CTE to further enhance the capability of the brazed joint.

Example 2

Alumina Brazed to Alloy D

Figure 4A:
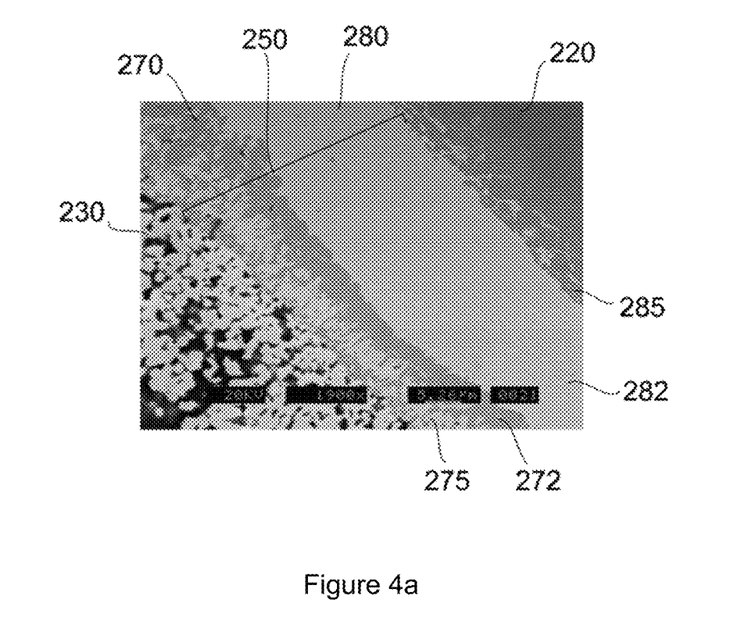
FIG. 4a shows a backscattered electron image of a typical region in a brazed joint made using AL-998 alumina and Alloy D.
Figure 4B:
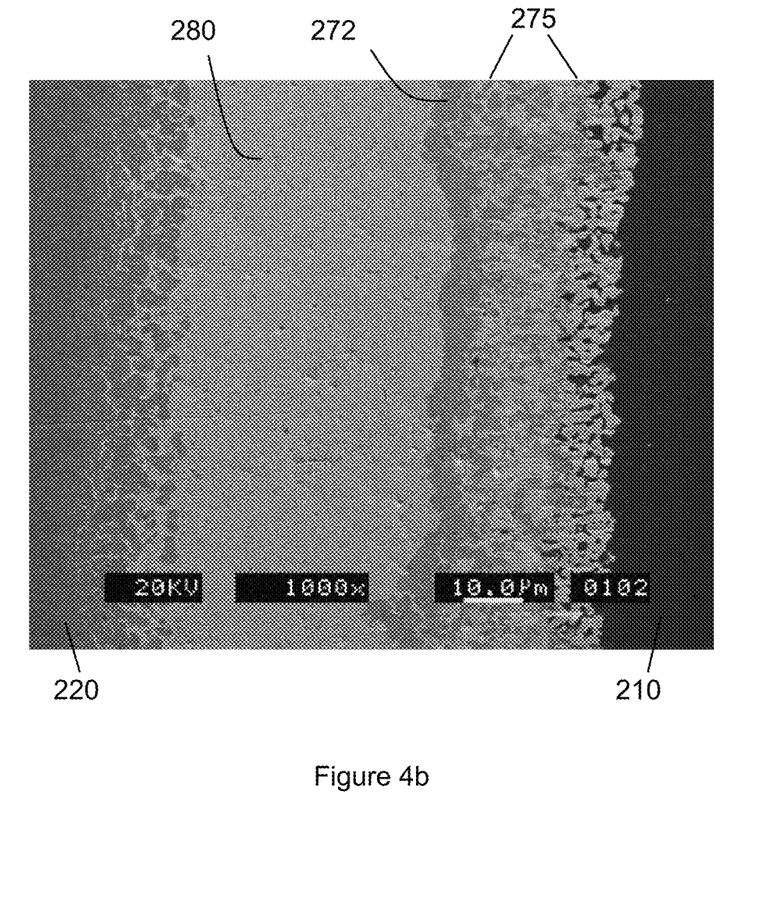
FIG. 4b shows another backscattered electron image of a typical region in a brazed joint made using AL-998 alumina and Alloy D which has been analysed by EDS to derive a chemical position of its components.

Referring now to FIGS. 4a & 4b, a brazed joint was made using a ceramic component 210 made from AL-998 alumina and a metal component 220 made from Alloy D according to the method described herein using the 82Au-18Ni wt % braze filler. The composition of the Alloy D is shown in Table 3.

TABLE 3

|  | Ni | Cr | Mo | Co | Al | Ti | C | Fe | Mn | Si | Cu |
| --- | --- | --- | --- | --- | --- | --- | --- | --- | --- | --- | --- |
| Min (wt %) | 46.2 | 18.0 | 9.0 | 10.0 | 1.4 | 3.0 | 0.1 | 0.0 | 0.0 | 0.0 | 0.0 |
| Max (wt %) | 58.5 | 20.0 | 10.5 | 12.0 | 1.8 | 3.3 | 0.1 | 5.0 | 0.1 | 0.5 | 0.5 |

The bonding layer 250 includes similar features to those observed in brazed joints made using AL-998 alumina and Alloy A described in Example 1. The average bonding layer 250 thickness is 31.6 microns, approximately 25% thinner than joints made using Alloy A. However, the prominent features remain the distributions of the distributions of the nickel-rich portion 270 and the gold-rich portion 280 in the bonding layer 250.

The nickel-rich portion 270 is present in the bonding layer 250 at an average distance of approximately 21.04 microns away from the surface of Alloy D in an amount that represents about 95 wt % of the total amount of the nickel-rich portion 270 in the bonding layer 250.

In joints made using Alloy A, the nickel-rich layer 272 is present in the bonding layer 250 at an average distance away from the surface of the metal component 220 that represents ~62% of the thickness of the bonding layer 250. Similarly, in joints made using Alloy D, the nickel-rich layer 272 is present in the bonding layer 250 at an average distance away from the surface of the metal component 220 that represents ~67% of the thickness of the bonding layer 250. This difference equates to the thickness of the gold-rich layer 282, and despite this being slightly thicker in joints made using Alloy D as compared with Alloy A, the test results obtained were similar. The eutectic-like distribution 275 between the nickel-rich layer 272 and the metallization layer 230 is slightly reduced in brazed joints made using Alloy D, however, these joints still achieved He hermeticity of $7.1 \times 10^{-10}$ mbar·L/s following oxidation resistance testing in air at 1100° F. for 72 hours and survived over 600 cycles of thermal cycling between −60° F. and 1100° F.

Another important observation is the more pronounced interpenetrating region 285 in joints made using Alloy D as compared with that in joints made using Alloy A. This may have been due to the differences in composition between the two Ni-based alloys, notably the 13 to 15 wt % W concentration in Alloy A as opposed to the 10 to 12 wt % Co concentration in Alloy D. However, this did not appear to affect the results of the tests performed indicating that the distributions of the nickel-rich portions 270 and the gold-rich portions 280 were in good proportion and within range.

Composition analysis of the nickel-rich layer (dark phase) 272 and gold-rich portion (light phase) 280 were derived from EDS spectrum are presented in Tables 4 & 5 respectively. The results indicate that a portion of the tungsten from the metallisation layer 230 had migrated into the nickel-rich layer 272, whilst the gold-rich phase was a composition similar to the Au—Ni braze filler, with the presence of a small amount or tungsten.

TABLE 4

| Nickel-rich phase (% wt) | | | |
| --- | --- | --- | --- |
| Sample | Ni | W | AU |
| 1 | 59.29 | 29.25 | 11.46 |
| 2 | 63.24 | 22.84 | 13.93 |

TABLE 4-continued

| Nickel-rich phase (% wt) | | | |
| --- | --- | --- | --- |
| Sample | Ni | W | AU |
| 3 | 63.16 | 20.36 | 16.47 |
| Average | 61.90 | 24.15 | 13.95 |

TABLE 5

| Gold-rich phase (% wt) | | | |
| --- | --- | --- | --- |
| Sample | Ni | W | AU |
| 1 | 18.54 | 0.00 | 81.46 |
| 2 | 17.23 | 0.71 | 82.06 |
| 3 | 17.44 | 2.03 | 80.53 |
| Average | 17.74 | 0.91 | 81.35 |

Figure 4C:
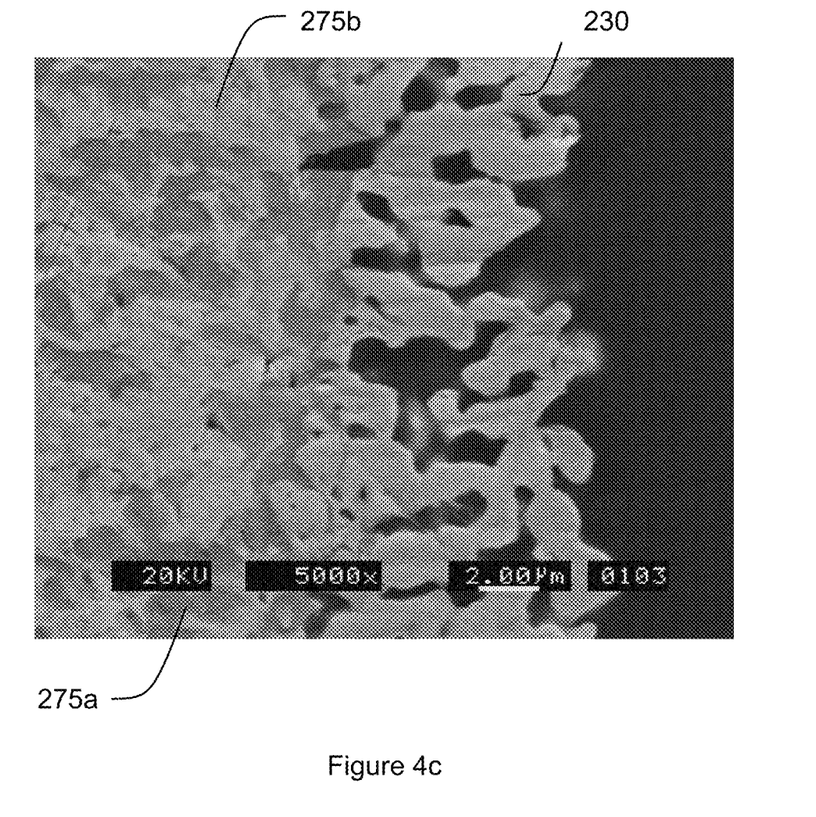
FIG. 4c shows a magnified backscattered electron image of the metallization layer and the metallization barrier layer of the brazed joint of FIG. 4b.

The EDS derived chemical composition of the metallisation layer was found to be predominately tungsten (Table 6). The EDS derived chemical composition of the eutectic-like mixture forming the interface between the nickel-rich layer 272 and the metallisation layer 230 revealed the dark phase 275a (Table 7) was a nickel-rich phase with an increased tungsten content relative to the nickel-rich layer 272. The light phase 275b was a gold-rich phase with a similar gold content compared to the gold-rich portion 280, but with an increased concentration of tungsten (Table 8).

TABLE 6

Metallization layer (% wt)

| Sample | Ni | W | AU |
|---|---|---|---|
| 1 | 1.66 | 98.34 | 0.00 |
| 2 | 8.21 | 90.64 | 1.16 |
| 3 | 15.59 | 82.98 | 1.33 |
| Average | 8.52 | 90.65 | 0.83 |

TABLE 7

Metallizing layer - Metallizing barrier layer interface
Dark phase (% wt)

| Sample | Ni | W | AU |
|---|---|---|---|
| 1 | 55.48 | 31.28 | 13.24 |
| 2 | 53.02 | 37.05 | 9.93 |
| 3 | 55.71 | 32.41 | 11.88 |
| Average | 54.74 | 33.58 | 11.68 |

TABLE 8

Metallizing layer - Metallizing barrier layer interface
Light phase (% wt)

| Sample | Ni | W | AU |
|---|---|---|---|
| 1 | 15.59 | 5.57 | 78.83 |
| 2 | 14.04 | 3.54 | 82.42 |
| 3 | 10.76 | 3.23 | 86.01 |
| Average | 13.46 | 4.11 | 82.42 |

Example 3

Alumina Brazed to Alloy E

Figure 5:
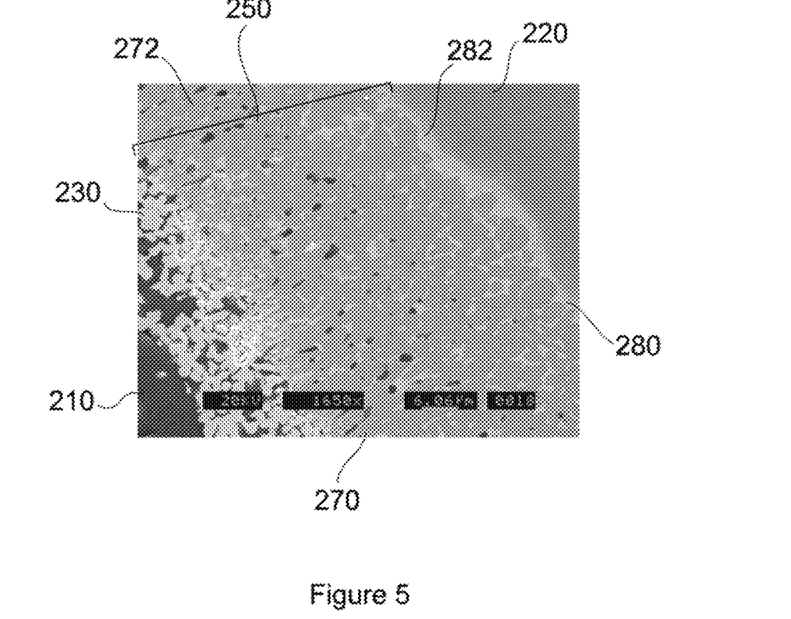
FIG. 5 shows a backscattered electron image of a typical region in a brazed joint made using AL-998 alumina and Alloy E.

Referring now to FIG. 5, a brazed joint was made using a ceramic component 210 made from AL-998™ alumina and a metal component 220 made from Alloy E according to the method described herein using the 82Au-18Ni wt % braze filler. The composition of the Alloy E is shown in Table 9.

TABLE 9

| | Ni | C | Fe | Mn | S | Si | Cu |
|---|---|---|---|---|---|---|---|
| Min (wt %) | 99.0 | 0.0 | 0.0 | 0.0 | 0.0 | 0.0 | 0.0 |
| Max (wt %) | 100.0 | 0.15 | 0.40 | 0.35 | 0.01 | 0.35 | 0.25 |

As per Examples 1 and 2, the concentration of nickel in the bonding layer 250 is derived from a combination of the 18 wt % Ni in the Au—Ni braze filler material, the 1 to 2 μm thick nickel plating observed to have entered into solid solution of the melt, and nickel resulting from the partial dissolution of the surface of Alloy E as indicated by the interpenetrating region 285. However, since Alloy E is composed of 99.0 wt % Ni to 100.0 wt % Ni, the dissolution of the metal component 220 leads to an excessive nickel-rich portion 270 distributed as isolated or agglomerated particles embedded in the gold-rich matrix extending between the metal component 220 and the metallization layer 230. The average bonding layer 250 thickness is approximately 45.5 microns and predominantly comprises of the nickel-rich phase. As a result, the gold-rich portion 280 appears as a dispersed phase in the bonding layer 250 while it was the predominated constituent of the braze filler material 150 in the brazing assembly 100. The effect of the bonding layer 250 becoming saturated in the nickel-rich portion 270 due to the bulk dissolution of Alloy E is that the gold-rich layer 282 interfacing the metal component 220 is only approximately 3.0 microns thick and the interpenetrating region 285 is less pronounced.

While these joints still achieved a He hermeticity of $3.5 \times 10^{-10}$ mbar·L/s following oxidation resistance testing in air at 1100° F. for 72 hours indicating good bonding, failure was observed after 500 cycles of thermal cycling between −60° F. and 1100° F. The excessive amounts of the Ni-rich portion 270 may have embrittled the joint. The reduced thickness of the gold-rich layer 282 may have reduced the ductility of the joint minimised the capability of the joint to accommodate thermally induced stresses. Image analysis reveal the cross-sectional area of the gold-rich phase was about 20% of the total cross-sectional area of the bonding layer.

Example 4

Alumina Brazed to Alloy B

Figure 6:
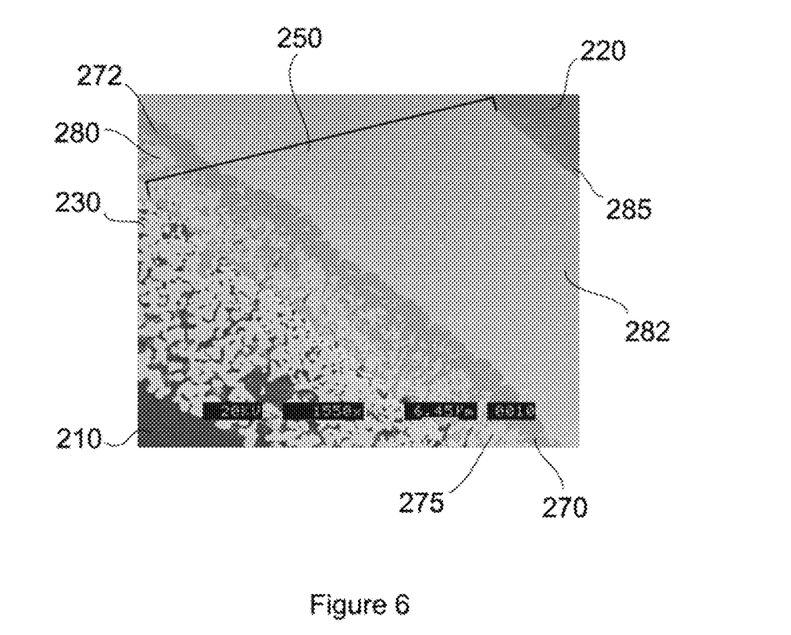
FIG. 6 shows a backscattered electron image of a typical region in a brazed joint made using AL-998 alumina and Alloy B.

Referring now to FIG. 6, a brazed joint was made using a ceramic component 210 made from AL-998 alumina and a metal component 220 made from Alloy B according to the method described herein using the 82Au-18Ni wt % braze filler. The composition of the Alloy B is shown in Table 10.

TABLE 10

| | Ni | Cr | Mo | Co | Ti | C | Fe | Mn | Si | Nb |
|---|---|---|---|---|---|---|---|---|---|---|
| Min (wt %) | — | 20.0 | 8.0 | 0.0 | 0.0 | 0.0 | 0.0 | 0.0 | 0.0 | 3.15 |
| Max (wt %) | 58.0 | 23.0 | 10.5 | 1.0 | 0.4 | 0.1 | 5.0 | 0.5 | 0.5 | 4.15 |

The bonding layer 250 again includes similar features to those observed in brazed joints made using AL-998 alumina and Alloy A and Alloy D, discussed in Examples 1 and 2 respectively. However, unlike joints made using Alloy E, this example shows the effect of a disproportionately low nickel-rich portion 270 and/or a disproportionately high gold-rich portion 280.

The average bonding layer 250 thickness is 51.6 microns, significantly thicker than joints made using the other nickel-based alloys. This may have resulted from a reduced dissolution of the metal component 220. Furthermore, an overall thicker bonding layer 250 may have increased the extent of thermally induced residual stresses generated at the joint interfaces upon cooling from the brazing temperature and during thermal cycling.

The nickel-rich portion 270 is present in the bonding layer 250 at an average distance of approximately 37.1 microns away from the surface of Alloy B in an amount that represents about 95 wt % of the total amount of the nickel-rich portion 270 in the bonding layer 250. While the gold-rich portion 280 extends between the metal component 220 and the metallization layer 230, the thickness of the gold-rich layer 282 depleted of the Ni-rich phase is significantly greater that that observed in all other examples.

A significantly thicker gold-rich layer 282 may have lacked reinforcement otherwise provided by the nickel-rich particulate phase. This may have weakened the overall strength of the joint. This may have been due to a reduced volume fraction of the nickel-rich portion 270 in the bonding layer 250 which may have been due to either a relatively thinner nickel plating, although more likely due to a reduced dissolution of Alloy B into the melt observed as a less prominent interpenetrating region 285 at the surface of the metal component 220.

These joints achieved a He hermeticity of $1.0 \times 10^{-7}$ mbar·L/s following oxidation resistance testing in air at 1100° F. for 72 hours indicating that bonding was also adversely affected by the relative microstructural changes in comparison with other examples, for example, the nickel-rich layer 272 may have been insufficient to provide the buffer layer to trap oxygen and/or to inhibit W from diffusing into the bonding layer 250 or being mobile such that W is not exposed to oxidation. Alternatively, the reduced hermeticity may have been due to a manufacturing artefact of the metal component 220 requiring further investigation. However, these joints also failed after 205 cycles of thermal cycling between −60° F. and 1100° F. It is likely, therefore, that the disproportionately low amount of the nickel-rich portion 270 may have led to these joints to have an excessively thick gold-rich layer 282 lacking reinforcement otherwise provided by the particulate Ni-rich phase.

Summary

The performance of the joints described in Examples 1 to 4 can be somewhat correlated to the CTE of the metal components (Table 11). Alloy A and Alloy D have the lowest CTE values provided optimum performance as compared with Alloy E and Alloy B. While joints made using Alloy E and Alloy B did not provide optimum performance, they may still be useful for other applications. The compositions of each of the nickel-based alloys leading to the dissolution of the metal component 220 into the melt may have also largely contributed to the resulting microstructural properties and joint performance.

TABLE 11

| Metal component | CTE ($\times 10^{-6} \cdot °F.^{-1}$) |
| --- | --- |
| Alloy D | 7.5-7.8 |
| Alloy A | 8 |
| Alloy B | 8.5 |
| Alloy E | 8.2 |

The findings can be summarised as follows:

1. The tungsten-yttria metallization layer 230 provides good bonding with the alumina ceramic component 210. Yttria may bond with Al in the ceramic component 210 and Al may bond with yttria in the metallization layer 230. Yttria may also facilitate sintering of tungsten during metallization. The tungsten in the metallization layer 230 imparts metallic character to the surface of the ceramic component 210 enabling the braze filler material 150 to wet and spread effectively during brazing. The tungsten further attracts the diffusion of nickel in the melt towards the metallization layer 230.
2. A gold-based braze filler material 150 coupled with nickel derived from the gold-based braze filler material 150 and/or the metallizing barrier layer 140 and/or the metal component 120 forms a bonding layer 250 with a nickel-rich portion 270 and a gold-rich portion 280 disposed between the metallizing layer 230 and a metal component 220.
3. The nickel-rich portion 270 migrates towards the metallization layer 230, likely due to the chemical affinity of Ni towards W in the tungsten-yttria metallization layer 230. The nickel-rich portion 270 is distributed in bulk form as a nickel-rich layer 272 between a region proximal to the ceramic component 210 and towards the centre of the bonding layer 250. The nickel-rich portion 270 is also distributed as isolated or agglomerated particles embedded in the gold-rich matrix 275 between the nickel-rich layer 272 and the metallization layer 230. The nickel-rich portion 270 may provide a buffer layer to trap oxygen and/or to inhibit W from diffusing into the bonding layer 250. The tungsten may also diffuse to the bonding layer 250 and be present in some of the nickel-rich particles in the bonding layer 250.
4. The gold-rich portion 280 extends the thickness of the bonding layer 250 i.e. between the metallization layer 230 and the metal component 220. The presence of the nickel-rich portion 270 as isolated or agglomerated particles embedded in the gold-rich matrix may provide reinforcement to the strength of the joint. The gold-rich portion 280 interfacing against the metal component 220 can infiltrate into the intergranular regions of the surface of the metal component 220 during partial dissolution forming the interpenetrating region 285. The interpenetrating region 285 may indicate an interlocking bond between the gold-rich layer 282 and the metal component 220.
5. The gold-rich layer 282 depleted of the nickel-rich portion 270 interfaces the metal component 220 and provides a highly ductile interlayer capable of plastically deforming to absorb stresses including thermally induced residual stresses arising due to CTE mismatch as well as stresses induced during thermal cycling.
6. In joints where the bonding layer 250 is 30 to 40 microns thick, the nickel-rich portion 270 is present in the bonding layer 250 at an average distance of −20 to −25 microns from the surface the metal component 220 in an amount that represents about 95 wt % of the total amount of the nickel-rich portion 270 in the bonding layer 250. This creates a gold-rich layer 282 depleted of the nickel-rich portion 270 that is generally ~60% to ~65% the thickness of the bonding layer 250.
7. In joints with excessive amounts of the nickel-rich portion 270, for example, where the metal component 220 is Alloy E, the gold-rich portion 280 is present as a dispersed phase and the gold-rich layer 282 interfacing the metal component 220 may be insufficiently thin minimising the capability of the joint to accommodate thermally induced stresses. Furthermore, excessive amounts of the Ni-rich portion 270 may embrittle the bonding layer 250 adversely affecting joint strength. Similarly, in joints with insufficient amounts of the nickel-rich portion 270, the gold-rich layer 282 may be excessively thick lacking reinforcement from the nickel-rich portion 270.
8. The layered bonding arrangement in preferred embodiments not only reinforces the strength of the joint but also enables load transfer to the highly ductile gold-rich layer 282 capable of plastic deformation. This arrangement may also provide a gradation in CTE to further enhance the capability of the brazed joint.
9. The metal component and gold-based braze filler appear to provide a source of nickel for the nickel-rich portion. Braze assembles with relatively low nickel levels in the metal component or the braze filler tended to reach lower performance levels.

The invention claimed is:
1. A brazed article comprising:
a ceramic component comprising alumina;
a metallizing layer comprising tungsten and yttrium oxide disposed against a surface of the ceramic component; and
a bonding layer disposed between the metallizing layer and a metal component;

wherein said bonding layer comprises a nickel-rich portion and a gold-rich portion, said gold-rich portion interfacing against the metal component; and wherein a cross-sectional area of a gold-rich portion is between 10% and 95% of the total cross-sectional area of the bonding layer, wherein the interface between the metal component and the gold-rich portion comprises an interpenetrating region.

2. The brazed article according to claim 1, wherein the nickel-rich portion comprises:
   40 to 80 wt % nickel;
   5 to 45 wt % tungsten; and/or
   1 to 20 wt % gold.

3. The brazed article according to claim 1, wherein the nickel-rich portion comprises a plurality of nickel-rich particles forming a non-uniformly distributed layer proximal to the ceramic component.

4. The brazed article according to claim 3, wherein the nickel-rich particles are encompassed by the gold-rich portion.

5. A method of manufacturing a brazed article according to claim 1, comprising the steps of:
   (A) providing a ceramic component comprising alumina
   (B) providing a source of yttrium oxide
   (C) metallizing a surface of the ceramic component with a tungsten component to form a metallizing layer
   (D) brazing a metal component to the ceramic component comprising the metallizing layer with a gold-based braze filler material and a source of nickel at sufficient brazing temperature and time to form a bonding layer comprising a braze filler material having a first metallic portion proximal to the ceramic component and a gold-rich portion interfacing against the metal component.

6. The method according to claim 5 further comprising the step, after step (C) and prior to step (D), of providing a metallizing barrier layer disposed against the metallizing layer.

7. The brazed article according to claim 1, wherein the nickel-rich portion comprises
   40 to 80 wt % nickel;
   5 to 45 wt % tungsten; and/or
   1 to 20 wt % gold.

8. The brazed article according to claim 1, wherein the nickel-rich portion comprises 45 to 70 wt % nickel.

9. A brazed article comprising:
   a ceramic component comprising alumina;
   a metallizing layer comprising tungsten and yttrium oxide disposed against a surface of the ceramic component; and
   a bonding layer disposed between the metallizing layer and a metal component;
   wherein said bonding layer comprises a nickel-rich portion and a gold-rich portion, said gold-rich portion interfacing against the metal component; and wherein a cross-sectional area of a gold-rich portion is between 10% and 95% of the total cross-sectional area of the bonding layer, wherein the nickel-rich portion comprises:
   40 to 80 wt % nickel;
   5 to 45 wt % tungsten; and/or
   1 to 20 wt % gold.

10. The brazed article according to claim 9, wherein the nickel-rich portion comprises 40 to 80 wt % nickel and 5 to 45 wt % tungsten.

11. The brazed article according to claim 9, wherein the nickel-rich portion comprises 45 to 70 wt % nickel.

12. The brazed article according to claim 9, wherein the nickel-rich portion comprises 10-45 wt % tungsten.

13. The brazed article according to claim 9, wherein the nickel-rich portion comprises 5-20 wt % gold.

14. The brazed article according to claim 9, wherein the nickel-rich portion comprises a plurality of nickel-rich particles forming a non-uniformly distributed layer proximal to the ceramic component.

15. The brazed article according to claim 14, wherein the nickel-rich particles are encompassed by the gold-rich portion.

16. The brazed article according to claim 9, wherein the interface between the metal component and the gold-rich portion comprises an interpenetrating region.

17. A brazed article comprising:
   a ceramic component comprising alumina;
   a metallizing layer comprising tungsten and yttrium oxide disposed against a surface of the ceramic component; and
   a bonding layer disposed between the metallizing layer and a metal component;
   wherein said bonding layer comprises a nickel-rich portion and a gold-rich portion, said gold-rich portion interfacing against the metal component; and wherein a cross-sectional area of a gold-rich portion is between 10% and 95% of the total cross-sectional area of the bonding layer, wherein the nickel-rich portion comprises a plurality of nickel-rich particles forming a non-uniformly distributed layer proximal to the ceramic component.

18. The brazed article according to claim 17, wherein the nickel-rich particles are encompassed by the gold-rich portion.

19. The brazed article according to claim 17, wherein the interface between the metal component and the gold-rich portion comprises an interpenetrating region.

20. The brazed article according to claim 17, wherein the nickel-rich portion comprises:
   40 to 80 wt % nickel;
   5 to 45 wt % tungsten; and/or
   1 to 20 wt % gold.

21. The brazed article according to claim 17, wherein the nickel-rich portion comprises 45 to 70 wt % nickel.

22. The brazed article according to claim 17, wherein the nickel-rich portion comprises 10-45 wt % tungsten.

* * * * *